UNITED STATES PATENT OFFICE.

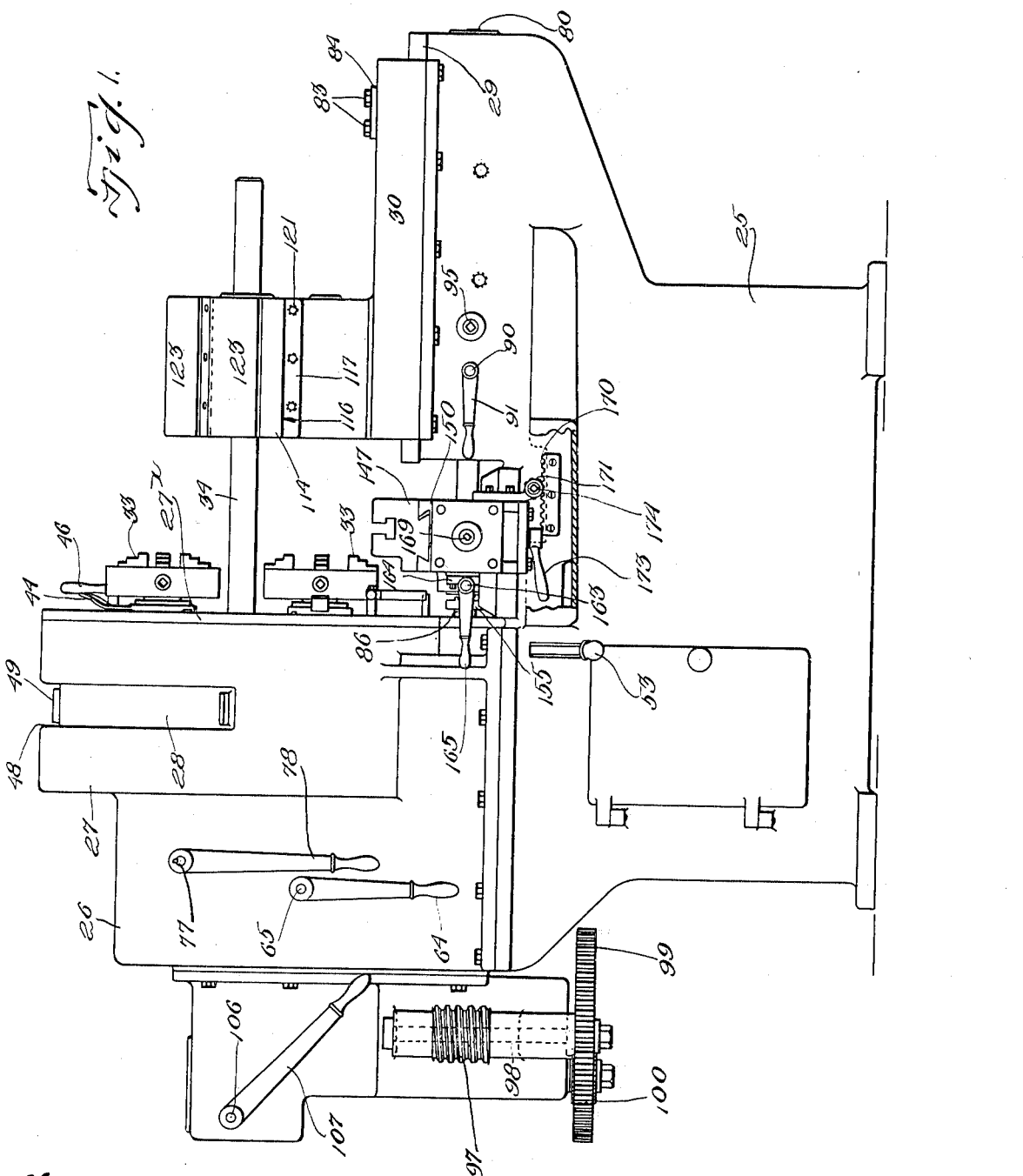

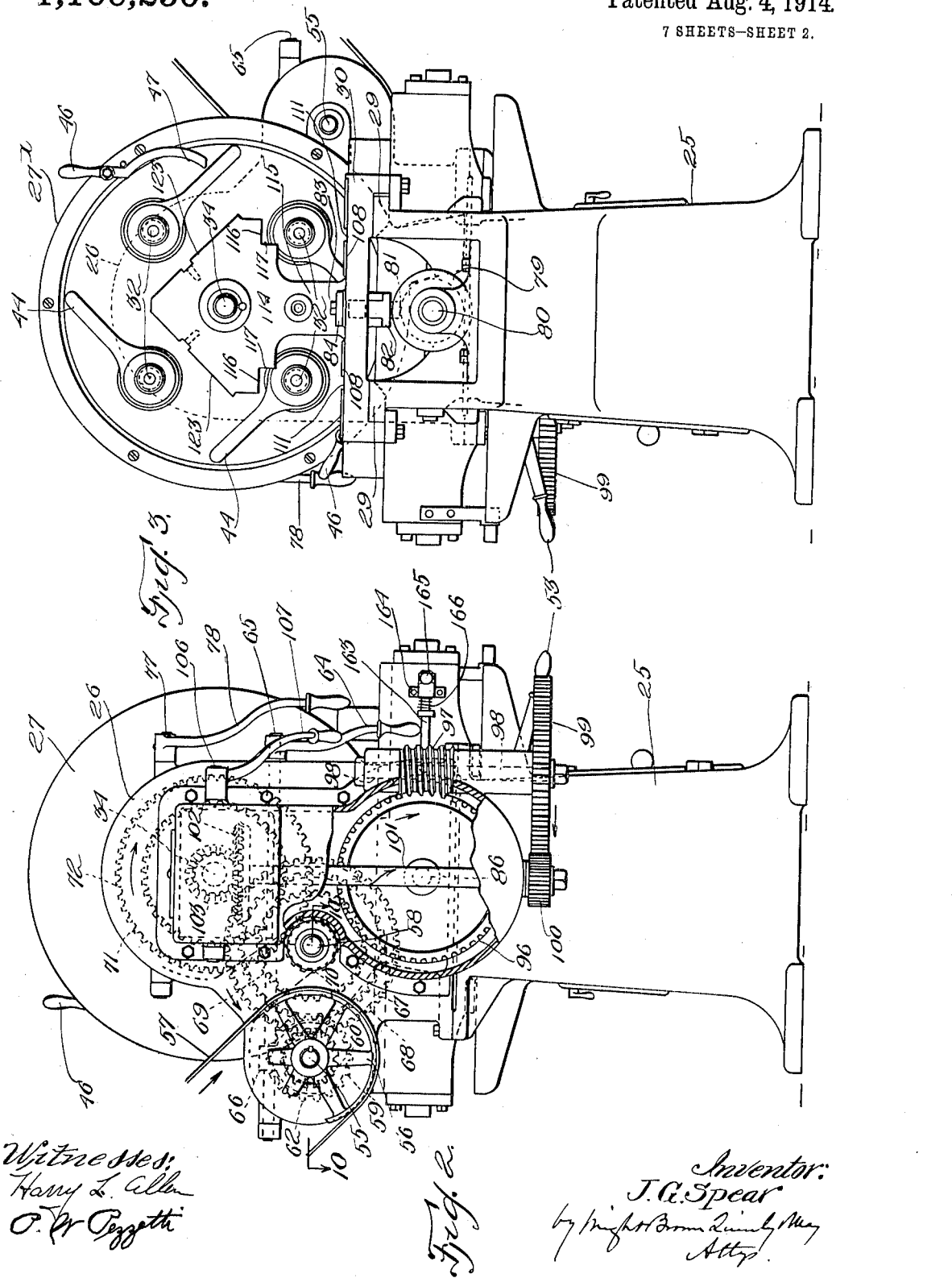

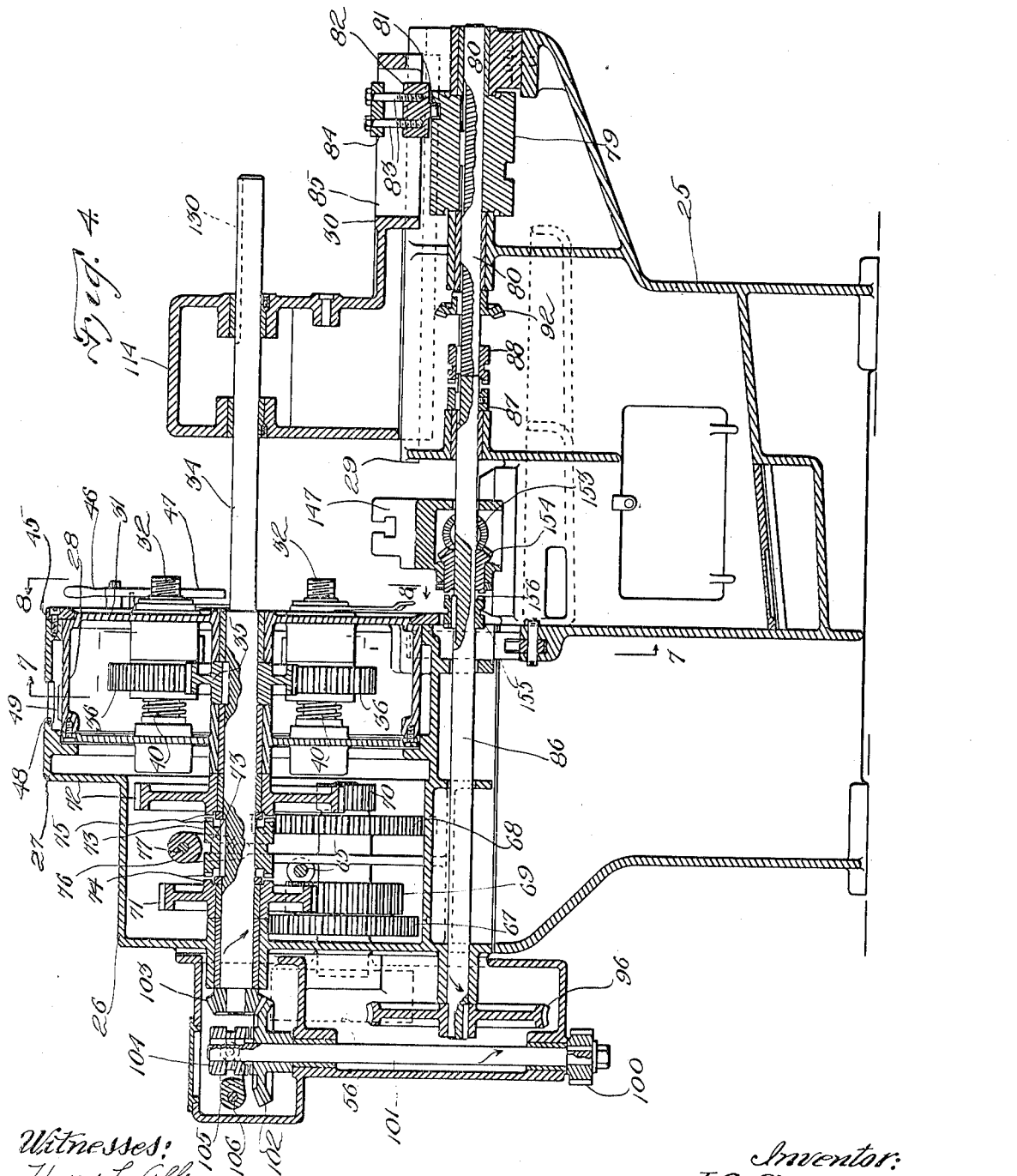

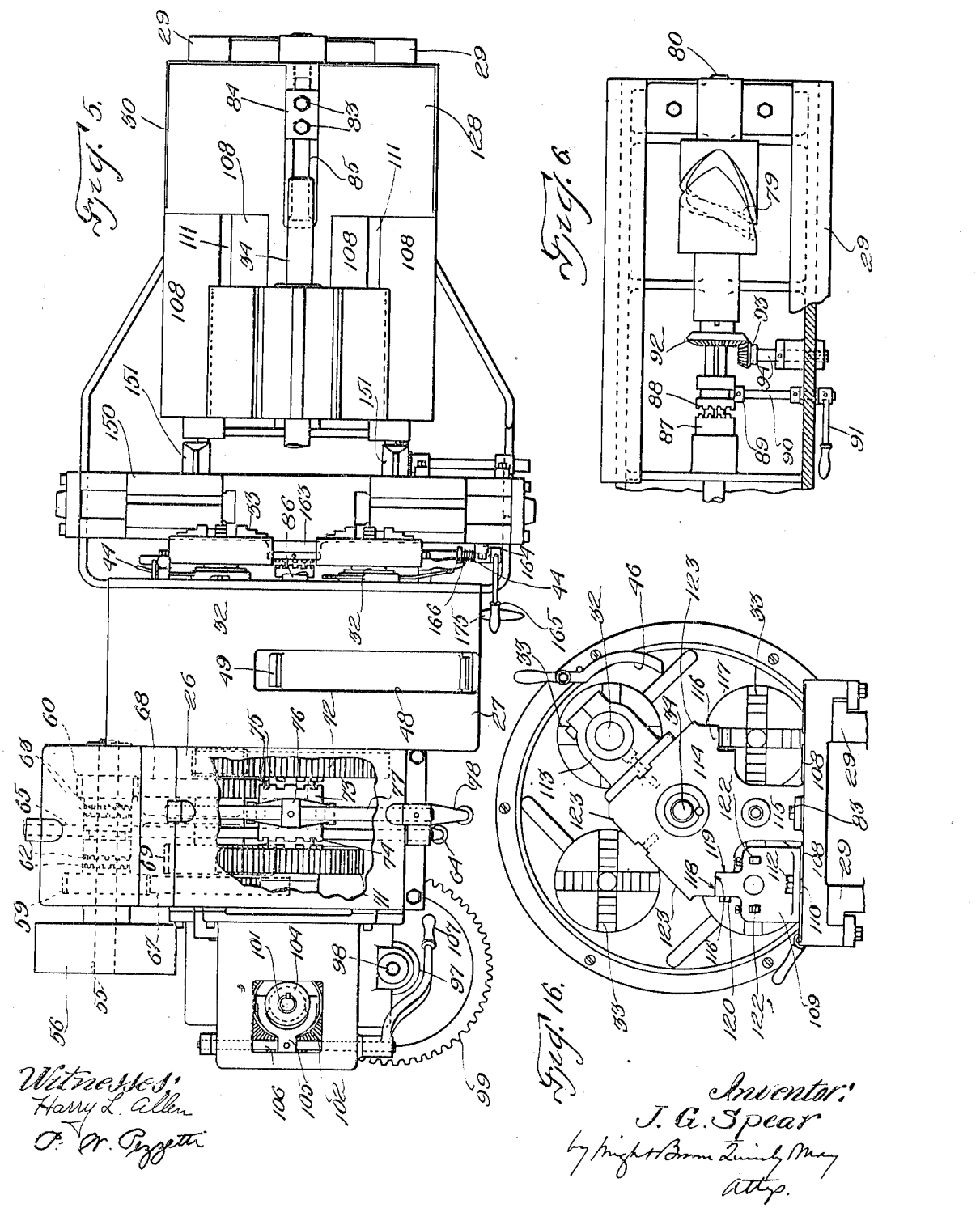

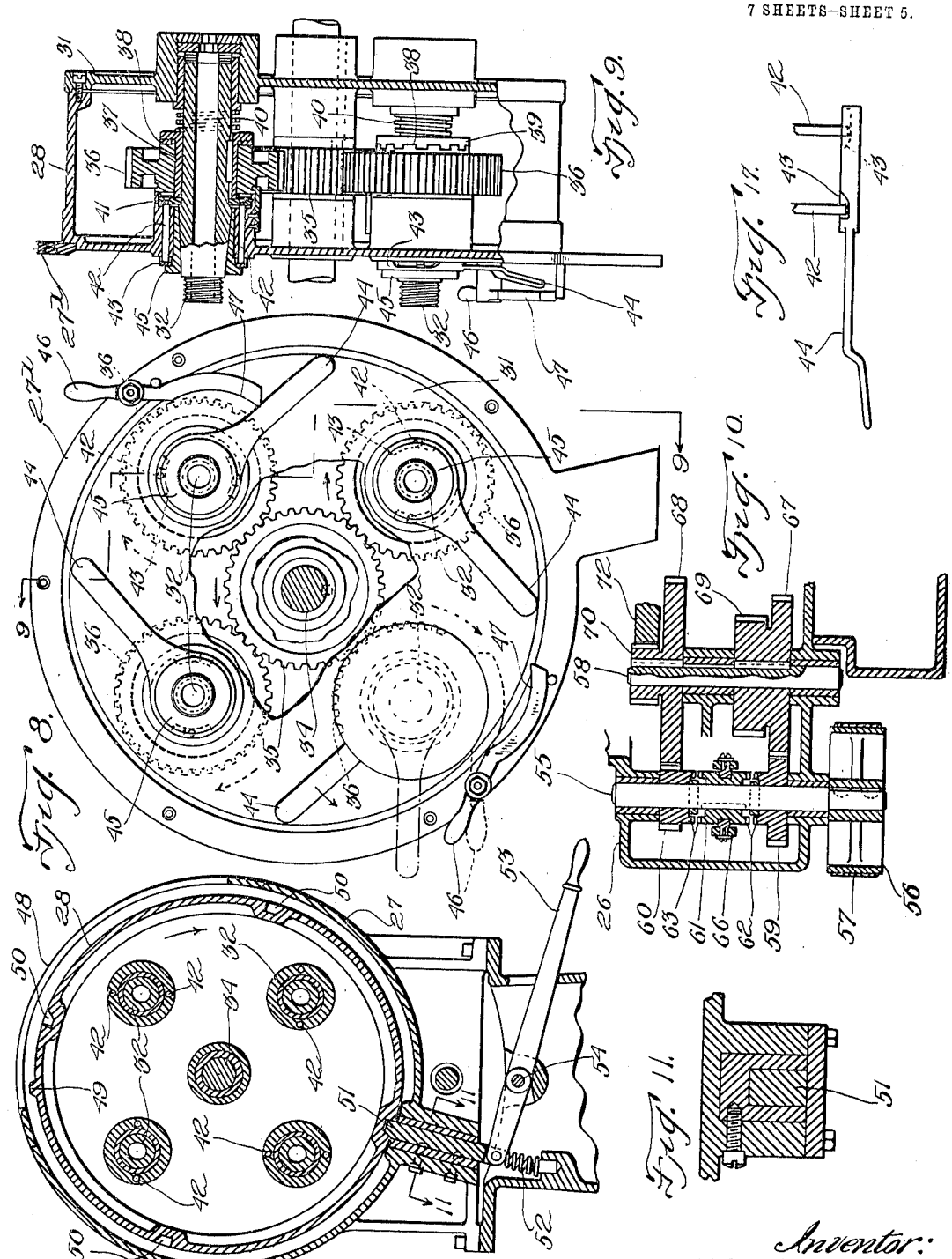

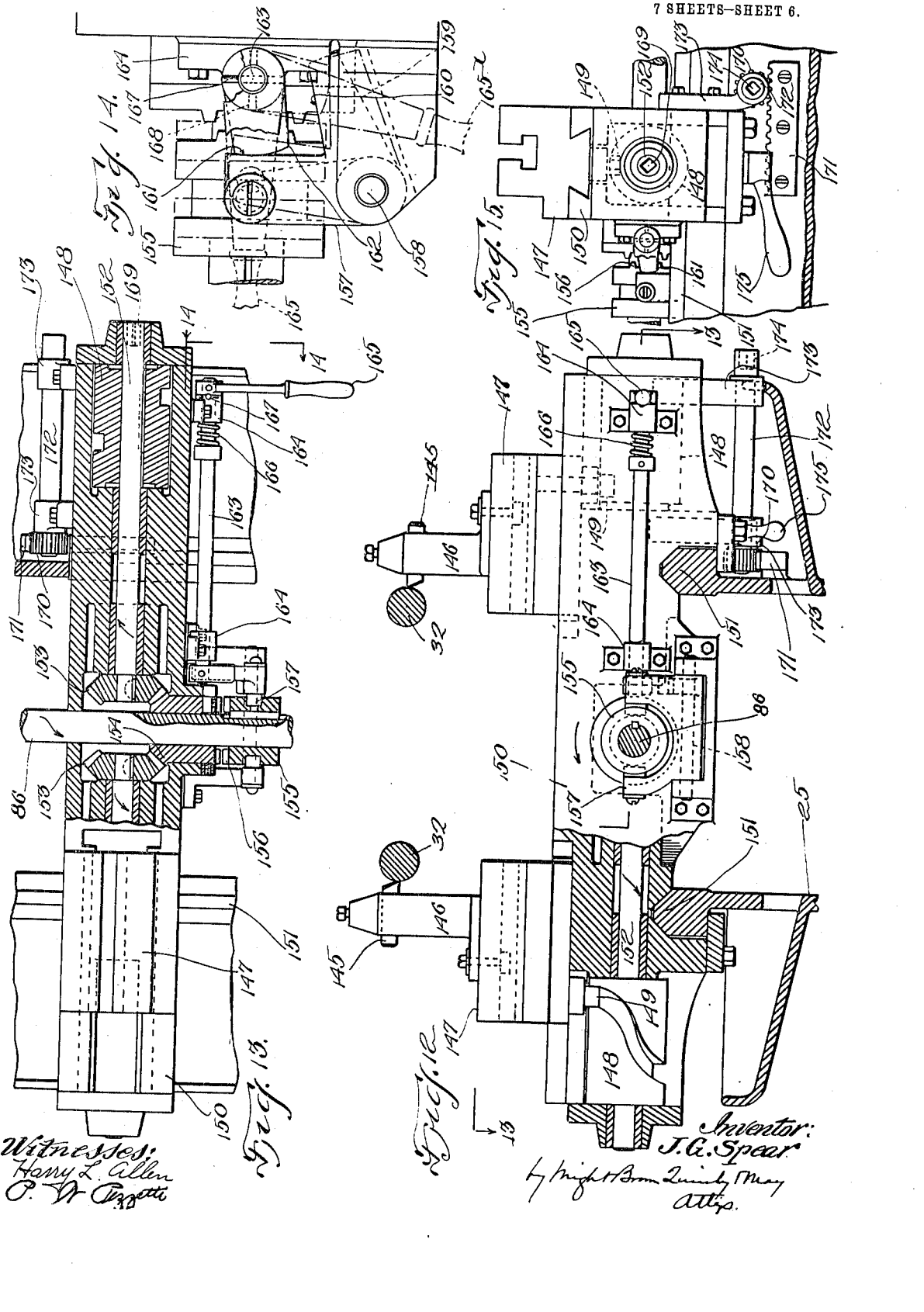

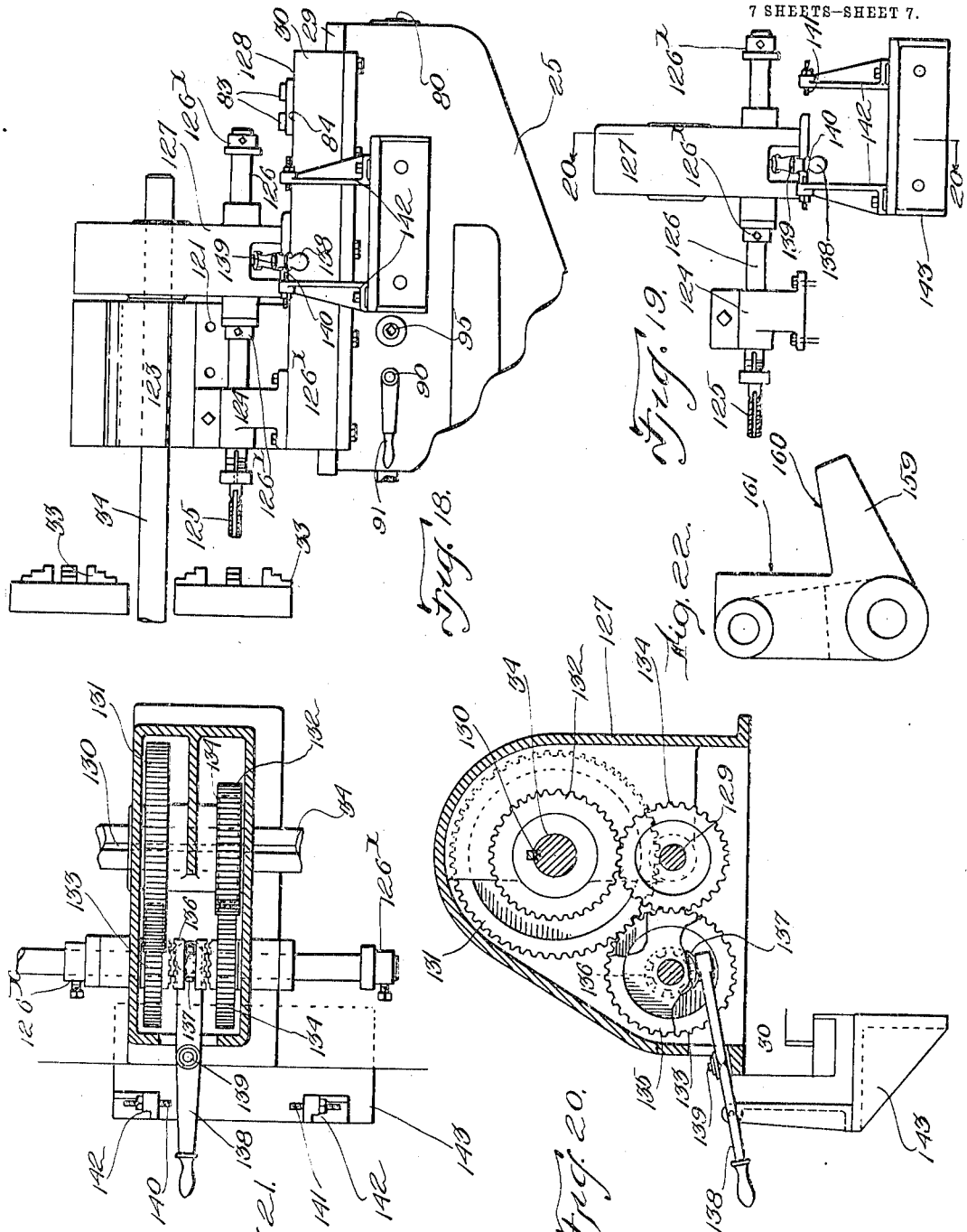

JOHN G. SPEAR, OF SPRINGFIELD, MASSACHUSETTS.

METAL-WORKING MACHINE.

1,106,250.      Specification of Letters Patent.      Patented Aug. 4, 1914.

Application filed September 13, 1911. Serial No. 649,155.

*To all whom it may concern:*

Be it known that I, JOHN G. SPEAR, a citizen of the United States, and resident of Springfield, in the county of Hampden and State of Massachusetts, have invented certain new and useful Improvements in Metal-Working Machines, of which the following is a specification.

This invention relates to metal-working machines in which some of the operations are automatic and in which others are effected manually.

The invention is embodied in a machine comprising a plurality of spindles for the work, a rotatable turret for mounting the spindles, driving mechanism for driving the spindles, tool slides, and mechanism for reciprocating the same. The turret in which the work spindles are mounted is designed to be manually rotated step by step to bring the spindles successively into operative relation with the several tools. The customary change speed gear mechanism is provided for driving the spindles at various speeds.

One of the objects of the invention is to mount the tools in such manner as to give them the greatest degree of stability to withstand the torsional stress exerted by the work. As previously stated, the machine includes a plurality of work spindles. The main tool slide consists essentially of a flat table upon which is a superstructure for supporting tools in operative relation to the upper work spindles, other tools being mounted upon the flat table in coöperative relation with the lower work spindles. The superstructure for the upper tools is connected with the flat table by a central vertical web, and it is formed to coöperate with the holders for the lower tools so as to be braced by the said holders when they are in working position. In this way the holders for the lower tools receive all strains due to torsional stress, thus rendering the superstructure more nearly rigid than if the central vertical web were subjected to the working strain.

Other features embodied in the present invention and illustrated by the accompanying drawings are hereinafter described.

On the drawings, which illustrate one form in which the invention may be embodied: Figure 1 represents a front elevation of a metal-working machine. Fig. 2 represents a left end elevation thereof, a portion of the gear casing being broken away. Fig. 3 represents a right end elevation of the machine. Fig. 4 represents a longitudinal vertical section in a central plane. Fig. 5 represents a top plan view of the machine, a portion of the gear casing being broken away. Fig. 6 represents a top plan view, partly in section, of the bed which supports the main feed slide. Fig. 7 represents a vertical cross section through the work turret, and locking device therefor. (See line 7—7 of Fig. 4). Fig. 8 represents a right-hand elevation of the work turret, a portion of which is broken away. (See line 8—8 of Fig. 4). Fig. 9 represents a vertical section through the work turret, as indicated by line 9—9 of Fig. 8. Fig. 10 represents a horizontal section through the primary gear case, as indicated by line 10—10 of Fig. 2. Fig. 11 represents a cross section through the device for locking the work turret. (See line 11—11 of Fig. 7). Fig. 12 represents a right-hand elevation, partly in cross section, of the cross slide feed mechanism, and includes the lower portion of the work turret. Fig. 13 represents a partial top plan view and partial horizontal section of the cross slide feed mechanism. (See line 13—13 of Fig. 12). Fig. 14 represents a front elevation of clutch-operating mechanism for the cross feed slides. Fig. 15 represents an elevation similar to Fig. 14, including one of the cross feed slides. Fig. 16 represents a right-hand elevation of the main tool slide and work turret. Fig. 17 represents a clutch-operating lever for disconnecting the driving mechanism of one of the work spindles. Fig. 18 represents a front elevation of the main feed slide equipped with attachments for drilling and tapping. Fig. 19 represents a similar elevation of the attachments included in Fig. 18. Fig. 20 represents a vertical cross section as indicated by line 20—20 in Fig. 19. Fig. 21 represents a top plan view of the mechanism included in Fig. 20, the gear casing appearing in section. Fig. 22 represents an elevation of a shipper which forms a part of the cross feed slide mechanism.

The same reference characters indicate the same parts wherever they occur.

The various mechanisms hereinafter described are mounted upon a base 25 of the cabinet type. Upon the left-hand end of the base is mounted a case 26 for the primary gearing, said case being formed with an enlarged portion 27 for containing the rotatable turret 28. The right-hand end of the base 25 is provided with flanged bed portions 29 upon which the main tool slide 30 is mounted.

The construction of the work turret 28, as shown by Figs. 4 and 9, includes a hollow cylindric portion and end walls, the end wall 31 being detachable. Suitable bearings are formed in the end walls for a plurality of work spindles 32. There are four work spindles in this embodiment of the invention, but the number may be varied. Each spindle is provided with a chuck 33 for holding a piece of work.

The turret 28 is loose upon a central shaft 34 which may be driven at various speeds in one direction by mechanism hereinafter described. A gear 35 (see Figs. 4, 8 and 9) affixed to the central shaft, is adapted to drive all the work spindles at the same time through the medium of gears 36, one of which is mounted upon each work spindle. The gears 36 are not affixed to their respective spindles, but they are adapted to be connected and disconnected by suitable clutch mechanism whereby any one or any number of spindles may be disconnected while one or some of the spindles are driven. The clutch mechanism for the individual spindles is shown by Figs. 8, 9 and 17. Each gear 36 is loosely mounted upon a clutch sleeve 37, each clutch sleeve being splined upon a work spindle. The sleeves 37 and the hubs of the gears 36 are provided with coöperative clutch teeth, indicated as a whole at 38 in Fig. 9.

Each clutch sleeve is normally held in driving engagement with its gear 36 by a spring 40 but may be disengaged manually independently of all the other clutches. The opposite end of each clutch sleeve 37 abuts against a ring 41 which is adapted to slide longitudinally upon the work spindle. Each ring 41 is provided with two pins 42, the pins being affixed to the ring and adapted to slide in bearings in the turret. The outer ends of the pins 42 project beyond their bearings, and are adapted to be engaged by cam surfaces 43 formed upon the hub of a manually operative lever 44. Each lever is free to turn about a flanged sleeve or bushing 45 surrounding the work spindle. The cam surfaces 43 are adapted to act in unison upon the pins 42 to transmit longitudinal movement to the clutch sleeve and thereby disengage the clutch sleeve from the hub of the gear 36.

As shown by Fig. 4, the turret casing 27 is provided with annular bearings for the work turret. A detachable ring or flange 45 is adapted to permit the insertion and removal of the turret and to hold the turret in its bearings. Since each work spindle is adapted to be uncoupled from the driving mechanism, the machine is provided with devices for holding the disconnected spindle or spindles against rotation so that the work will not revolve when subjected to the action of a drill or tap. These devices (see Figs. 3 and 8) are in the form of levers 46, each of which has a braking surface 47 adapted to engage the periphery of a chuck 33. Each lever 46 is pivotally mounted upon the detachable ring 45 in such position as to coöperate with a chuck when the spindles are in coöperative relation with tools. In the present instance there are two stop levers 46, that number being generally sufficient.

The turret 28 is intended to be rotated manually and is provided with a locking device by which it may be locked in any one of its several working positions. The locking device is also adapted to be operated manually to release the turret.

Referring to Figs. 1, 4, 5 and 7, the turret casing 27 is formed with an opening 48 extending through an arc which, in the present instance, is slightly more than 90 degrees of a circle, since the turret is provided with four work spindles which are 90 degrees apart. The opening 48 is provided to enable the attendant to engage the turret manually to turn the same. For this purpose ribs or spurs 49 are formed upon the periphery of the turret in order to facilitate turning the same, the spurs and the opening 48 being in the same plane so that the spurs will be exposed for manipulation. Since the turret is intended to be turned through steps of 90 degrees, four spurs 90 degrees apart are provided. The periphery of the turret is further provided with four recesses 50 for the reception of a locking pin 51. The locking pin is mounted in a suitable bearing and is normally projected into engagement with the turret by a spring 52. A lever 53, pivoted at 54, is connected to the locking pin for retracting the same. The lever 53 is so arranged as to be easily grasped with one hand while the appropriate rib or spur 49 on the turret is engaged by the other hand.

The gearing for driving the central shaft 34 is shown by Figs. 2, 4, 5 and 10. Referring first to Figs. 2 and 10, a prime power shaft is indicated at 55, this shaft being mounted in suitable bearings at the rear of the gear case 26. The shaft 55 is provided with a pulley 56 by which it may be driven through the medium of a belt 57. A countershaft 58 likewise mounted in suitable bearings in the gear case 26 is interposed between the shaft 55 and the central shaft 34 to transmit rotation from the former to the latter. Before describing the gearing, it may be stated that the countershaft may be driven at a fast speed or at a slow speed relatively to the prime power shaft 55, and that the central shaft 34 may be driven at a fast speed or at a slow speed with relation to the countershaft. Referring again to Fig. 10, it will be seen that the shaft 55 carries two pinions, indicated at 59 and 60, pinion 59 being for driving the countershaft at relatively fast speed, and pinion 60 being for driving the countershaft at a relatively slow speed. These pinions are not fixed to the shaft 55 but are loosely mounted thereon at some distance apart, and between them is mounted a clutch sleeve 61 which is splined upon the shaft. The confronting ends of the clutch sleeve and pinion 59 are provided with coöperative clutch teeth 62, and the confronting ends of the clutch sleeve and pinion 60 are provided with coöperative clutch teeth 63. Through the medium of the clutch sleeve, either of the pinions may be operatively connected with the power shaft. The sleeve may be moved into engagement with either of the pinions by manipulating the lever 64. (See Figs. 1, 2 and 5). The lever is affixed upon a rock shaft 65 which extends through the gear case and which is provided with a shipper 66 engaging the clutch sleeve in the well known manner.

The pinion 59 meshes with a gear 67 keyed to the countershaft, and the pinion 60 meshes with a gear 68 likewise keyed to the countershaft. The gear 67 is provided with a pinion 69, here shown as formed as an integral part. In like manner the gear 68 is formed or provided with a pinion 70. The pinion 69 meshes with a gear 71 loosely mounted upon the central shaft 34. (See Figs. 2 and 4). The pinion 70 meshes with a gear 72 likewise loosely mounted upon the central shaft. A clutch sleeve 73 is splined upon the central shaft between the gears 71 and 72, the ends of the sleeve and the confronting ends of the gear hubs being provided with coöperative clutch teeth indicated respectively at 74 and 75. A shipper 76 affixed upon a rock shaft 77 is adapted to move the clutch sleeve into engagement with either gear. The rock shaft 77 is provided with a hand lever 78 at the front of the machine. (See Figs. 1, 2 and 5. Since the pinions 69 and 70 are respectively large and small, and the gears 71 and 72 are respectively small and large, it is apparent that the central shaft 34 may be driven at relatively fast or slow speed without changing the speed of the countershaft; and since the countershaft may be driven at fast or slow speed, a wide range of gearing is available for driving the work spindles.

The main tool slide 30 and the cross feed slides hereinafter described are driven by gearing which receives its power from the central shaft 34. (See Figs. 3 and 4). Referring first to the main slide 30, a feed cam 79 therefor is keyed upon a shaft 80 mounted in suitable bearings in the right-hand end of the base 25. The cam is grooved for the reception of a roll 81 carried by a block 82 adjustably secured to the slide 30. The block 82 is clamped against an under surface of the feed slide by clamping screws 83 which extend through a plate 84 seated upon an upper surface of the slide. The slide is formed with a longitudinal slot 85 for the reception of the clamping screws 83 and for portions of the members 82 and 84, which are rabbeted, as shown by Fig. 3. The purpose of this adjustable connection is to vary the range of movement of the slide with relation to the operating cam. The shaft 80 is arranged in abutting end to end relation with a shaft 86 which extends to the left-hand end of the machine, and with which the shaft 80 may be connected in driving relation or from which it may be disconnected to permit feeding of the slide manually. The driving connections between the shafts 86 and 80 (see Fig. 4) comprises a clutch member 87 affixed to the shaft 86, and a sliding clutch sleeve 88 splined upon the shaft 80 and provided with teeth adapted to engage coöperative teeth on the member 87. As shown by Fig. 6, the clutch sleeve 88 is grooved for the reception of a stud or projection carried by a lever 89. The lever is affixed to a rock shaft 90 mounted in a bearing in the base 25 and is provided with a hand lever 91 by which the clutch members may be engaged or disengaged. When the shaft 80 is uncoupled from the shaft 86, it may be rotated manually through the medium of bevel gears 92, 93, (see Fig. 6), the gear 92 being affixed to the shaft 80 and the gear 93 being affixed to a shaft 94 having a bearing in the front of the base 25. The outer end of the shaft 94 is formed with an angular socket 95 (see Fig. 1) for the reception of a hand crank of well known form.

The left-hand end of the shaft 86 is provided with a worm gear 96. (See Figs. 2 and 4). This gear is driven by a worm 97 affixed upon a vertical shaft 98. At the lower end of the shaft 98 is a gear 99 which meshes with a pinion 100 affixed to the lower end of a vertical shaft 101. Loosely mounted upon the upper end of the shaft 101 is a bevel gear 102 which is driven by a bevel pinion 103 affixed to the central shaft 104. The gear 102, being driven continuously, may be connected to or disconnected from the shaft 101, through the medium of a sliding clutch sleeve 104. The sleeve and the hub of the gear have complemental teeth (shown by Fig. 4) by which driving connection may be made. This sleeve is splined upon the upper end of the shaft 101 and is moved to and from engagement with the gear 102 by a shipper 105 (see Figs. 4 and 5) affixed to a rock shaft 106. The rock shaft is provided with a hand lever 107. By means of this clutch mechanism all the tool slides may be disconnected while the work spindles continue rotating.

Referring to Fig. 4, it will be seen that the right-hand end of the shaft 34 is reduced in diameter and has bearings in the upper portion of the main slide 30. This connection between the turret 28 and the tool slide assists in maintaining accurate register of the tools with the work, and it further serves to drive a train of gearing which may be attached to the slide for operating a drill or tap. The construction of the slide 30 is further illustrated by Figs. 1, 3, 5 and 16. The lower part of the slide is formed with flat horizontal surfaces 108 which serve as tables for two tool holders such as that indicated at 109 in Fig. 16. These surfaces are designed for receiving two of such tool holders, supporting them in a relatively low plane in coöperative relation with the two lower work spindles. The tool holders are formed with tongues 110 on their lower surfaces, and the tool slide is formed with grooves 111 for the reception of said tongues, whereby the tool holders are held rigidly in alinement with the work spindles. The tool holders may be fixed upon the slide in any well known manner, such, for example, as by means of clamping bolts 112.

The tools for the upper spindles are mounted in holders such as that indicated at 113. (See Fig. 16). These holders are mounted upon a head or top 114 forming a part of the slide 30 and connected with the base of the slide by a neck or web 115. Tongue and groove fittings for the holders 113 are provided the same as those for the holders 109. The holders 109 are freely accessible, because the neck 115 is disposed between them. The tool holders secured to the head 114 are equally accessible, no part of the slide intervening between the tool holders and the attendant.

An improved feature of the head or top 114 and tool holders 109 is the manner in which they are formed so as to utilize the holders to brace the head and render it substantially rigid so that it may withstand torsional strain without yielding. As shown by Figs. 1 and 16, the head 114 extends laterally in both directions from the neck or web and overhangs the surfaces upon which the lower tool holders bear. These overhanging portions of the head 114 are formed with meeting faces 116 and 117, and the tool holders 109 are formed with longitudinal flanges having faces 118 and 119 adapted to abut against the faces 116 and 117 respectively. The distance between the bottom face of the tool holder and the top face 118 is equal to the space between the faces 108 and 116 of the slide, and when both holders 109 are in working position, as shown by Fig. 16, the head 114 of the slide is amply braced by the tool holders so as to relieve the neck or web 115 of all torsional strain. The rib upon the top of each tool holder 109 is bored for the reception of a clamping screw 120, and the head 114 is provided with a series of tapped holes 121 (see Fig. 1) any one of which may receive the clamping screw 120. By means of the clamping screw, the ribs upon the tool holders may be clamped tightly against the lateral faces 117 of the head 114. The purpose in providing a number of holes 121 is to give a range of adjustment for the tool holders. The tools mounted in the holders 109 are indicated at 122. The arrangement of the faces 123 upon which the upper tool holders 113 are mounted may be varied if desired, but in the present embodiment of the invention they are arranged at an angle of 90 degrees to each other, each face being at an angle of 45 degrees to the horizontal, since this arrangement provides the following advantages: First, it presents the bases of the tool holders 113 closer to the neck and thereby increases the rigidity of the mounting; second, it causes the chips to slide off, the lower edges of the inclined faces being so far apart as to cause the chips to pass over the lower tool holders and over the sides of the base of the slide and drop to the floor; third, it reduces the bulk of the head and leaves more unoccupied space above the base.

A boring and tapping attachment may be mounted upon the slide 30 so as to employ a drill or tap in place of one of the tool holders 109. A spindle or shaft 126 for holding the drill or tap is mounted in bearings afforded by a gear case 127 and a bearing afforded by a bracket 124 bolted upon the slide in place of a tool holder 109. The gear case is designed to be secured upon the surface 128 at the right of the slide 30, and it is provided with additional bearings for the central shaft 34 and with bearings for a countershaft 129. The right-hand end of the central shaft 34 is provided for a considerable portion of its length with a keyway 130. The boring and tapping attachment includes driving gears and reversing gears which receive their power from the shaft 34. A relatively large gear 131 and a relatively small gear 132 are mounted upon the central shaft so as to slide longitudinally thereon, but are connected in driving relation with the shaft by suitable keys which slide in the keyway 130. The gear 131 meshes with a gear 133 loosely mounted upon the shaft or spindle 126, while the gear 132 meshes with an idle gear 134 mounted upon the countershaft 129. The gear 134 meshes with the gear 135, also loosely mounted upon the spindle 126. The gear 133, as shown by Fig. 20, is driven at a relatively fast speed to the left, while the gear 135 is driven at a relatively slow speed to the right. Either of these two gears may be operatively connected to the spindle by a clutch sleeve 136 (see Fig. 21), the sleeve being splined upon the spindle between the gears and having clutch teeth adapted to be engaged with complemental teeth on the hubs of the gears. The sleeve is adapted to be moved into operative connection with either gear by a shipper 137 carried by a lever 138 pivoted at 139 to a portion of the gear case. While the feed slide is moving forward or back, the keys in the gears 131 and 132 will slide in the keyway 130 of the central shaft and maintain driving connection between the shaft and the trains of gears.

Additional devices, illustrated by Figs. 18 to 21 inclusive, may be used to automatically shift the clutch sleeve 136 when a tap 125 is inserted in the spindle 126. The clutch lever 138 projects from the gear case so that it is adapted to move forward and back between adjustable stops 140 and 141. These stops are shown in the form of setscrews and are mounted in brackets 142 which in turn are mounted upon a bracket 143 which may be attached to the front of the base 25. When the tapping attachment is ready to cut a thread, the clutch lever 138 is moved to place the clutch sleeve in operative engagement with the slow speed gear 135 which imparts right-hand rotation to the spindle 126. The feed slide is then advanced, thus causing the tap 125 to enter the hole in the work. The spindle 126 is capable of longitudinal movement relatively to its mountings in order to enable the tap to advance commensurately with the pitch of the thread. The independent longitudinal movement of the spindle 126 may be limited by collars 126ˣ adjustably secured by setscrews. If the lead of the thread which the tap is cutting causes the tap to advance more rapidly than the slide 30, the left-hand collar 126ˣ would initially be set against the adjacent bearing on the gear case 127, and a space for independent movement of the spindle would be left between the gear case and the right-hand collar 126ˣ. On the other hand, if a tap for cutting a relatively fine thread be used, which would retard the longitudinal movement of the spindle relatively to the slide 30, a space would be left between the left-hand collar 126ˣ and the gear case, which space would be taken up while the slide advances more rapidly than the tap.

When the lever 138 strikes the stop 140, continued movement of the slide 30 causes retraction of the clutch sleeve 136 from the driving gear 135, and the rotation of the tap ceases. The clutch sleeve 136 eventually engages the clutch teeth on the hub of the gear 133 immediately prior to the beginning of the return movement of the slide 30, thus causing reverse rotation of the tap so that it may draw out of the work. As the slide 30 reaches its initial position the lever 138 engages the stops 141, thus shifting the clutch sleeve back to the driving gear 135, and the mechanism is ready to repeat the operation of tapping another piece of work.

The facing tools, which move transversely with relation to the axes of the work, are indicated in Fig. 12 at 145. They are mounted in holders 146 and are arranged to act upon the work carried by the two lower spindles. The holders 146 are mounted upon slides 147 which are reciprocated by cams 148, the slides being provided with cam rolls 149 which occupy grooves formed in the cams. The slides are mounted upon a bed 150 which is movable longitudinally of the work spindles, the base 25 being provided with guides 151 upon which the bed is mounted, as shown by Fig. 12. (See also Fig. 5). The movement of the slides 147 with relation to the bed 150 is transverse with relation to the movement of the bed upon the base.

The cams 148 which reciprocate the tool slides are driven in unison by gearing which receives power from the longitudinal shaft 86, but the said gearing is adapted to be disconnected at will. As shown by Figs. 12 and 13, each cam 148 is keyed upon a shaft 152, the two shafts being arranged in alinement with each other and mounted in suitable bearings in the movable bed 150. The adjacent ends of the shafts 152 are provided with bevel gears 153 which both mesh with a bevel gear 154 loosely mounted upon the shaft 86. A clutch sleeve 155 splined upon the shaft 86 is provided with clutch teeth 156 adapted to engage complemental teeth formed upon the hub of the gear 154. The sleeve 155 is grooved for the reception of a shipper 157. The shipper is mounted to rock upon a stud 158 and is provided with an arm 159. (See Fig. 22). One face of the arm 159 (which face is indicated at 160) and a face 161 are nearly at right angles to each other and are intended to be engaged by an oscillatory actuator 162 affixed upon a rock shaft 163. The rock shaft is mounted in brackets 164 affixed to the movable bed 150. A hand lever 165 is affixed to the shaft 163 near the front of the machine. When the hand lever is raised to a substantially horizontal position, the actuator 162 engages the face 161 of the shipper, thus holding the clutch sleeve out of engagement with the gear 154; but when the handle 165 is turned to the lower position, as indicated by dotted lines 165ˣ in Fig. 14, the actuator 162 moves out of contact with the face 161 and into contact with the face of the arm 159, thus moving the clutch sleeve into engagement with the gear 154. When the actuator 162 is in the position first described, and illustrated by Fig. 14, the shipper is positively held so that the clutch sleeve cannot engage the gear; and, on the other hand, when the actuator is in its other position, the clutch sleeve is positively locked in driving relation. The rock shaft 163 is capable of a slight longitudinal movement and is normally held toward the left, as shown by Figs. 12 and 13, by a spring 166. A pin 167 extends transversely through the rock shaft (see Fig. 14) both ends of the pin projecting beyond the rock shaft. The pin is adapted to be seated in grooves 168 formed in the adjacent bracket 164, and is normally held against the bracket by the spring 166 so that the rock shaft becomes locked with yielding tension in either of its two extreme positions.

When the clutch sleeve 155 is disengaged from the gear 154, the cross feed slides may be manually moved forward or back by inserting a hand crank (not shown) in an angular socket 169 (Figs. 1 and 13) in the shaft 152 on the front side of the machine.

A movement of the bed 150 relatively to the base 25 may be effected for preliminarily adjusting the facing tools toward or from the work turret. For this purpose the bed (see Figs. 1, 12, 13 and 15) is provided with a pinion 170 which coacts with a rack 171 affixed to the base 25. The pinion is affixed upon the rear end of a shaft 172 which is mounted in brackets 173 affixed to the bed 150, and the forward end of the shaft is provided with an angular socket 174 for the reception of a hand crank whereby the desired movement of the bed may be effected. A binding device 175 is provided for binding the bed 150 upon the guides 151 after the bed has been set at the desired position.

Having thus explained the nature of my said invention and described a way of constructing and using the same, although without attempting to set forth all the forms in which it may be made or all the modes of its use, what I claim is:

1. In a metal-working machine, a plurality of rotatable work holders disposed about a common axis, tool holders for the several pieces of work, and a slide for carrying the tool holders, said slide having a base and a head both for supporting tool holders, and a neck connecting said head with the base between two tool holders on the base, said head and tool holders on the base having coöperative portions adapted to sustain the torsional stress exerted on the head by the work.

2. In a metal-working machine, a plurality of rotatable work holders disposed about a common axis, tool holders for the several pieces of work, and a slide for carrying the tool holders, said slide having a base adapted to support two tool holders, a neck between said two tool holders, and a head supported by said neck for another tool holder, said head overhanging the tool holders on the base and having faces adapted to bear against said tool holders whereby said tool holders are adapted to sustain the torsional stress exerted on the head by the work.

3. In a metal-working machine, a plurality of rotatable work holders disposed about a common axis, tool holders for the several pieces of work, and a slide for carrying the tool holders, said slide having a base, a neck between two tool holders on the base, and a head supported by said neck for carrying another tool holder, said head having portions overhanging and engaging said two tool holders on the base, and means rigidly connecting said overhanging portions directly to said two tool holders.

4. In a metal-working machine, means for holding a plurality of pieces of work, a tool slide comprising a base and having provisions for securing two tool holders side by side upon the base in potential working relation to two of said pieces of work, said slide comprising also a portion extending upwardly between the tool holders on the base, said portion having provisions for securing one or more tool holders above those on the base in potential working relation to one or more other pieces of work.

5. In a metal-working machine, a plurality of work holders, a tool slide and power-driven means arranged to move the same, a tool holder affixed to said slide and arranged to coöperate with one of said work holders, a rotatable tool holder and means carried by said slide to carry said rotatable holder to and from potential working relation with another one of said work holders, and power-driven means arranged to rotate said rotatable tool holder while the latter is in working engagement with the work.

6. In a metal-working machine, a plurality of parallel rotatable work-holders disposed about a common axis, a tool slide provided with means for rigidly holding a tool in position to act upon one of the pieces of work, said slide being further provided with rotatable means for holding a tool in position to act upon another piece of work, a driven shaft arranged so that its axis coincides with the aforesaid axis, said shaft having a bearing in said tool slide, a gear affixed to said shaft, driven gears on said work holders and engaging the gear on said shaft, and gearing including a gear splined upon said shaft for driving said rotatable tool-holding means.

7. In a metal-working machine, a rotatable turret, a plurality of spindles rotatably mounted therein, sleeves splined on said spindles, gears mounted upon said sleeves so as to be rotatable independently of the sleeves, said sleeves and gears having coöperative clutch portions adapted to be connected and disconnected by relative axial movement, means for driving said gears, means for holding said gears against axial movement, and manually operative means for moving said sleeves axially.

8. In a metal-working machine, a rotatable turret, a plurality of spindles rotatably mounted therein, sleeves splined on said spindles, gears mounted upon said sleeves so as to be rotatable independently of the sleeves, said sleeves and gears having coöperative clutch portions adapted to be connected and disconnected by relative axial movement, means for driving said gears, means for holding said gears against axial movement, manually operative levers mounted upon the exterior of the turret at the end where the work is exposed for operation, and means operative by said levers for moving said sleeves axially.

9. In a metal-working machine, a tool slide comprising a base and having provisions for securing two tool holders side by side thereon, said slide comprising also a neck extending upwardly between the tool holders on the base, and a head upon said neck and extending laterally therefrom so as to overhang the tool holders on the base, said overhanging portions having provisions for securing additional tool holders, whereby all of said tool holders may be in potential working relation to the work at the same time.

10. In a metal-working machine, a tool slide comprising a base and having provisions for securing two tool holders side by side thereon, said slide also comprising a portion extending upwardly between the tool holders on the base, said portion having two oppositely inclined surfaces above the base for supporting additional tool holders, whereby the contacting surfaces of said additional tool holders are brought toward each other.

11. In a metal-working machine, a tool slide comprising a base and having provisions for securing two tool holders side by side thereon, said slide comprising also a neck extending upwardly between the tool holders on the base, and a head upon the neck and extending laterally therefrom over the tool holders on the base, said head having oppositely inclined surfaces whose lower portions overhang the tool holders on the base and whose upper portions are toward each other, said surfaces being adapted for supporting additional tool holders.

12. In a metal-working machine, means for supporting a plurality of pieces of work one over another, and a tool slide having means for supporting a lower tool holder in potential working relation to a lower piece of work, and having an inclined upper surface for supporting a tool holder in potential working relation to an upper piece of work, said inclined surface overhanging said supporting means for the lower tool holder so as to cause the gravitating chips from the upper piece of work to be deflected laterally beyond the said supporting means.

13. In a metal-working machine, a plurality of work holders, a tool slide and power-driven means arranged to move the same, a tool holder affixed to said slide and arranged to coöperate with one of said work holders, a rotatable tool holder and means carried by said slide to carry said rotatable holder to and from potential working relation with another one of said work holders, a power-driven shaft arranged parallel to the traverse of said tool slide, and transmission means carried by said slide to transmit rotation from said shaft to said rotatable tool holder.

In testimony whereof I have affixed my signature, in presence of two witnesses.

JOHN G. SPEAR.

Witnesses:
W. R. ABELL,
P. W. PEZZETTI.